United States Patent
Zerza et al.

(10) Patent No.: US 12,306,083 B2
(45) Date of Patent: May 20, 2025

(54) DEVICE AND METHOD FOR DETERMINING A POSITION AND/OR AN EXTENSION OF A DROP

(71) Applicant: TECAN TRADING AG, Mannedorf (CH)

(72) Inventors: Gerald Zerza, Salzburg (AT); Josef Grassl, Schonau am Konigsee (DE); Alwin Schuller, Neumarkt am Wallersee (AT)

(73) Assignee: TECAN TRADING AG, Mannedorf (CH)

( * ) Notice: Subject to any disclaimer, the term of this patent is extended or adjusted under 35 U.S.C. 154(b) by 1113 days.

(21) Appl. No.: 17/120,882

(22) Filed: Dec. 14, 2020

(65) Prior Publication Data

US 2021/0181223 A1 Jun. 17, 2021

(30) Foreign Application Priority Data

Dec. 16, 2019 (EP) .................................... 19216570

(51) Int. Cl.
*B01L 3/02* (2006.01)
*G01N 13/02* (2006.01)
(Continued)

(52) U.S. Cl.
CPC .............. *G01N 13/02* (2013.01); *B01L 3/021* (2013.01); *B01L 3/0293* (2013.01); *G01N 21/6486* (2013.01); *G01N 35/1011* (2013.01); *G01N 35/1016* (2013.01); *H04N 7/18* (2013.01); *B01L 2200/0605* (2013.01); *B01L 2200/061* (2013.01);
(Continued)

(58) Field of Classification Search
CPC ........... G01N 35/1011; G01N 21/6486; G01N 35/1016; G01N 2035/1013; G01N 15/1436; G01N 13/02; G01N 2013/0241; G01N 2015/1481; G01N 21/84; G01N 21/31; G01N 21/64; B01L 3/021; B01L 3/0293; B01L 2200/0605; B01L 2200/061;
(Continued)

(56) References Cited

U.S. PATENT DOCUMENTS

| 4,328,801 A | 5/1982 | Marx et al. |
| 6,851,784 B1 * | 2/2005 | Kietzmann ........... B01L 3/0241 356/337 |

(Continued)

FOREIGN PATENT DOCUMENTS

WO 2014114500 A1 7/2014

*Primary Examiner* — John McGuirk
(74) *Attorney, Agent, or Firm* — Notaro, Michalos & Zaccaria P.C.

(57) ABSTRACT

A device for determining a position and/or an extension of a drop in a position determination space, where the device has a camera having an objective and a beam splitter in the recording area of the camera, and the device is designed in such a way that light coming from the position determination space can enter the objective of the camera along a first light path as well as along a second light path, where light along the first light path can be reflected at a first reflector element in the direction of the beam splitter and can be transmitted through the beam splitter towards the objective, and where light along the second light path can be reflected at a second reflector element in the direction of the beam splitter and can be reflected at the beam splitter towards the objective.

15 Claims, 5 Drawing Sheets

(51) Int. Cl.
   *G01N 15/14*   (2024.01)
   *G01N 21/64*   (2006.01)
   *G01N 35/10*   (2006.01)
   *G02B 27/14*   (2006.01)
   *H04N 7/18*    (2006.01)

(52) U.S. Cl.
   CPC ............... *B01L 2200/0626* (2013.01); *G01N 2015/1481* (2013.01); *G01N 2035/1013* (2013.01); *G02B 27/14* (2013.01)

(58) Field of Classification Search
   CPC ... B01L 2200/0626; H04N 7/18; G02B 27/14; G01B 11/00; G01B 11/08; G01B 11/28
   See application file for complete search history.

(56) References Cited

U.S. PATENT DOCUMENTS

| | | | |
|---|---|---|---|
| 2007/0086021 A1* | 4/2007 | Teichman | B05B 12/124 356/621 |
| 2012/0095433 A1 | 4/2012 | Hungerford et al. | |
| 2014/0206093 A1* | 7/2014 | Bjornson | B01L 3/0241 422/82.08 |

\* cited by examiner

DEVICE AND METHOD FOR DETERMINING A POSITION AND/OR AN EXTENSION OF A DROP

The present invention relates to a device for determining a position and/or an extension of a drop. The invention further relates to a measuring device comprising the device, a pipetting robot comprising the device, a pipetting robot comprising the measuring device, as well as to a method for determining a concentration of a substance in a drop, in particular for determining a concentration of nucleic acids such as RNA or DNA, of proteins or of other biological or organic substances. Furthermore, the invention relates to a method for holding a drop in the position determination space of the device, as well as a method for regulating a drop size.

In the technical fields of analytics and liquid handling it is desirable to be able to analyze and handle small amounts of liquid, if possible without a loss of liquid present at the beginning due to the applied method. For example, the international publication WO 2014/114500 A1 discloses an optical measuring device that can be used to analyze a drop of liquid hanging from the tip of a pipette. With this measuring device, decanting into another container or contact with light guides etc. is not necessary to perform the measurement. Such measures would inevitably lead to a loss of liquid. The disadvantage of this method, however, is that the accuracy or repeatability of the measurement results may be lower with a pendant drop than if the sample had been placed in a container, e.g. in a well of a microplate.

It was the object of the present invention to provide an alternative solution for the handling of liquid portions or measurements of liquid portions to be placed in a container. It was a further object of the invention to improve the accuracy of the determination of a concentration of a substance in a drop.

According to the invention, the object is solved by a device according to claim 1.

The device according to the invention is a device for determining a position and/or an extension of a drop in a position determination space. Alternatively to the position determination, the device can be designed to determine an extension of the drop, for example a diameter of the drop. The device can be designed to determine the extension of the drop in combination with the determination of the position.

The device according to the invention comprises a camera with an objective and a beam splitter in the recording area of the camera. The recording area of the camera is in front of the objective and comprises the spatial area that can be imaged from the object onto the image sensor of the camera. The device is designed in such a way that light coming from the position determination space can enter the objective of the camera along a first light path as well as along a second light path into the objective of the camera. On the one hand, light can be reflected along the first light path on a first reflector element in the direction of the beam splitter and can pass through the beam splitter to the objective. On the other hand, light can be reflected along the second light path on a second reflector element in the direction of the beam splitter and can be reflected at the beam splitter towards the objective.

This means that light from the position determination space reaches the beam splitter on two separate paths, either via the first reflector element or via the second reflector element. In the first case, at least part of the light reaches the camera due to the partial transmittance of the beam splitter through the beam splitter. In the second case, the light is at least partially reflected in the direction of the camera. The beam splitter thus forms an optical branching. It lets light partially pass and partially reflects light.

In this way, the camera can simultaneously or successively take images from two different directions of view of the position determination space. If there is a drop in the position determination space, its three-dimensional position can be determined by combining the images from different viewing directions. Furthermore, an extension of the drop can be determined from these images, for example by the number of pixels the image of the drop occupies on the image sensor. The extension of the drop can be, for example, a diameter of the drop in horizontal direction. The extension of the drop can be, for example, a projection area of the drop in a projection along a horizontal direction.

A light path is the geometric path that light continues to follow when light is irradiated on the light path and in the direction of the light path, wherein reflection and refraction effects of optical elements are considered. Optical elements, in the device according to the invention these are namely the first and second reflector element, the beam splitter and the objective of the camera, define the possible light paths, even if no light is present in the device. In addition to the first and second light path, a whole bundle each of possible light paths can lead from the position determination space to the camera via the first and second reflector element, respectively. It is important that there is at least one first light path via the first reflector element and at least one second light path via the second reflector element from the position determination space to the camera.

The inventors have recognized that based on the device according to the invention, the exact three-dimensional position and, depending on the need additionally or alternatively, the extension of a drop can be determined with sufficient accuracy so that it is not necessary to hold the drop in a container or to fix a dimension of the drop between two plates. Exact irradiation of a quantity of liquid at a predetermined position, e.g. in the plane of the largest horizontal extension of a drop, holding a quantity of liquid at a predetermined position, fixing a predetermined diameter of a quantity of liquid, etc. are possible with the device according to the invention without the quantity of liquid having to be accommodated in a container. This makes it possible to perform a large number of measurements or handling steps directly on a drop. In particular, it can be a hanging drop, e.g. a drop hanging at the opening of a pipette tip. The device according to the invention, if suitably designed, also makes it possible to determine the position of a falling drop at a certain point in time.

In particular, it is possible to determine the position in relation to a beam path of an optical measuring device, as will be explained in detail below in connection with the measuring device according to the invention.

The position of other objects besides the drop is also possible, so that a relative position of the drop to another object can be determined by means of the device.

A first path length of the first light path from the intersection in the position determination space to the beam splitter can differ from a second path length of the second light path from the intersection in the position determination space to the beam splitter. When determining dimensions from the images, a conversion factor can be applied in this case, which depends on the respective path length and compensates the resulting deviating magnification or reduction factor.

Embodiments of the device result from the features of the dependent claims 2 to 7.

In one embodiment of the device, the first and second light paths intersect at an intersection point in the position determination space. In particular, the first and the second light path can intersect at right angles.

In one embodiment of the device, a first path length of the first light path from the intersection in the position determination space to the beam splitter is equal to a second path length of the second light path from the intersection in the position determination space to the beam splitter.

In this embodiment, the two images from the different directions of view of the position determination space can be combined particularly easily, since there is no distortion of the sizes due to different path lengths from the drop to the camera. In this embodiment, the dimensions determined from the images can be compared directly and no conversion between drop or shadow sizes taken via the first or second light path is necessary.

In one embodiment of the device, sections of the first and second light path between the intersection in the position determination space and the first and second reflector elements define a first plane, wherein sections of the first and second light path between the beam splitter and the first and second reflector elements define a second plane. In this case, the second plane is tilted with respect to the first plane.

This means that the first and the second plane intersect at an angle greater than zero. The position of the first and second planes according to this embodiment can be achieved by tilting the first and second reflector elements relative to one plane of the beam splitter. If the plane of the beam splitter and the first and second reflector elements were arranged in planes parallel to each other, the first and second planes defined above would be identical and not tilted against each other.

This embodiment allows placing the camera outside the first plane. As the inventors have recognized, it is possible with this embodiment in particular to accommodate the position determination space of the device at a location in a device or installation comprising the device where the available space is limited laterally adjacent to the position determination space.

In one embodiment of the device, the device further comprises a first and a second lighting element. The first lighting element and the first reflector element are arranged on opposite sides of the position determination space. The second lighting element and the second reflector element are arranged on opposite sides of the position determination space. The first lighting element is adapted to illuminate a drop in the position determination space parallel to a direction of the first light path in front of the first reflector element and the second lighting element is adapted to illuminate a drop in the position determination space parallel to a direction of the second light path in front of the second reflector element.

With this embodiment of device, the camera captures a kind of shadow image. When a drop is in the position determination space, it receives illumination from behind along both the first and second light path, i.e. from the side that is facing away from the camera as seen along the light path. The first and second lighting elements can each have a light source, such as an LED (Light Emitting Diode) or an incandescent lamp. The light source can emit monochromatic light or it can also be a broadband light source, for example with white light. For example, the lighting elements can additionally have one or more lenses. With lenses, for example, light coming from the lighting elements can be directed into a larger cross-section parallel to the respective light path, thus increasing the light intensity available in the camera along the respective light path. Lighting elements can include diffuser elements, such as roughened glass or plastic plates. The first and second lighting elements can be arranged in this embodiment with a 90° offset from each other with respect to a center of the position determination space.

In one embodiment of the device comprising a first and a second lighting element, the first and the second lighting element are designed to alternately not illuminate the position determination space in a temporal respect at all or to illuminate it individually. In particular, the first and the second lighting element can be of essentially identical construction.

In the temporal phase completely without illumination, for example, optical measurements can be performed in which light from the illumination sources would interfere. While a single lighting element is switched on, an image from the corresponding direction can be captured by the camera, which is completely unaffected by possible reflections of light from the other of the first and second lighting elements.

In one embodiment of the device, the beam splitter, the first reflector element, the second reflector element and the camera are located outside an area that includes the position determination space and its imaginary continuation in the direction of gravity.

This arrangement of the elements of the device takes into account the possible falling direction of the drop. In this way, wetting or soiling of the elements due to unintentional dropping of the drop can be avoided. For example, the elements of the device, in particular the first and second reflector element, may be arranged laterally to the side of the position determination space with respect to the direction of gravity. In particular, the objective of the camera may be located outside the area into which a drop may fall.

The embodiments of the device can be combined in any way, as long as they are not mutually exclusive.

In a further aspect, the invention relates to measuring device according to claim 8.

The measuring device according to the invention can be a measuring device for measuring an absorption of electromagnetic radiation in a drop. Alternatively or in combination with the device for measuring absorption, the measuring device may also be a measuring device for measuring a fluorescence excited by electromagnetic radiation in a drop. The measuring device comprises a device according to the invention for determining a position and/or an extension of a drop in a position determination space. The measuring device further comprises a source of electromagnetic radiation and a detector for electromagnetic radiation. In this case, the measuring device is designed in such a way that electromagnetic radiation can arrive at the detector along a radiation path starting from the radiation source via a drop in the position determination space. Electromagnetic radiation can reach the drop directly or indirectly from the radiation source. For the indirect path, for example, a radiation path via monochromator or through a glass fiber light guide is conceivable. The device according to the invention, which is part of the measuring device according to the invention, is designed to determine the position of the drop in relation to the radiation path.

For example, the measuring device can be designed to evaluate the absorption of electromagnetic radiation at several wavelengths or to evaluate it over a spectrum of wavelengths. In the event of an absorption measurement, electromagnetic radiation passes through the drop and then enters the detector, where the intensity of the wavelength that was irradiated onto the drop is evaluated. In the event of a fluorescence measurement, the incoming radiation excites a fluorescence of a substance in the drop and generates electromagnetic radiation of another wavelength. The detector then measures the intensity of the other wavelength, e.g. of visible light or infrared radiation, when electromagnetic radiation in the UV range is irradiated onto the drop. In the event of fluorescence measurement, for example, the detector is positioned in a direction that deviates from the direction of incidence of the radiation incident on the drop, e.g. in a direction that deviates by 90°. Several detectors for fluorescence measurement are also possible, e.g. on both sides of the direction of incidence of the irradiated electromagnetic radiation, each in a direction deviating by 90°. Absorbance or fluorescence measurement can be combined in one embodiment of the measuring device. For example, the irradiation for absorbance and fluorescence measurement can be realized by the same radiation source. A first detector in a straight line behind the drop in the irradiation direction can be used for the absorbance measurement and a second detector, with sensitivity in another wavelength range, can be arranged in a direction originating from the drop perpendicular to the direction of the first detector, and serve for the measurement of a fluorescence. Another possibility of a combined measuring device for absorption and fluorescence can be realized by arranging the detectors and radiation sources on two different planes, wherein at least one of the planes is provided with the device according to the invention.

Such a measuring device can be called a "drop spectrometer". The inventors have recognized that for the operation of such a drop spectrometer, precise control of the position of the drop and the drop size is crucial for accurate measurement results. A positioning accuracy of better than 70 µm is preferred. A positioning accuracy of better than 50 µm is particularly preferred. Due to the device according to the invention, the measuring device according to the invention is equipped with an optical system which is able to record position information about a drop in three dimensions in a surprisingly simple way using a single camera. In addition, this optical system can be mounted in an extremely space-saving arrangement.

An embodiment of the measuring device results from the features of the dependent claim 9.

In one embodiment of the measuring device, the first light path, the second light path and the radiation path intersect at a common point of intersection in the position determination space.

The determination of the position of a drop in relation to the radiation path is particularly precise if the drop is located at the common point of intersection of the light paths and the radiation path. For example, the two light paths and the radiation path can be located in a common plane in the area of the point of intersection. For example, the two light paths can intersect each other at an angle of 90° and the radiation path at an angle of 45°.

In a further aspect, the invention relates to a pipetting robot according to claim 10 or to a pipetting robot according to claim 11.

A pipetting robot according to the invention comprises a device according to the invention for determining a position and/or an extension of a drop in a position determination space. The pipetting robot is designed for
moving a pipette tip into the position determination space of the device,
forming a drop of a liquid outside an opening of the pipette tip, and
determining the position of the formed drop in the position determination space by means of at least one image recorded with the camera.

The pipetting robot, for example, is a three-axis robot that can move the pipette tip in three coordinate directions of a Cartesian coordinate system. The pipetting robot includes for example means for aspirating and/or dispensing a liquid. The pipetting robot may also include holders for microplates.

Another pipetting robot according to the invention comprises a measuring device according to the invention for measuring an absorption of electromagnetic radiation in a drop and/or for measuring fluorescence excited by electromagnetic radiation in a drop. The pipetting robot further comprises means for moving at least one pipette tip in at least one direction of movement. The pipetting robot is designed:
to move the at least one pipette tip into the position determination space of the device,
to form a drop of a liquid outside an opening of the pipette tip,
to determine the position and/or an extension of the formed drop in the position determination space on the basis of at least one image taken with the camera, and
to measure an absorption of an electromagnetic radiation in the drop and/or to measure a fluorescence excited by an electromagnetic radiation in a drop using the measuring device.

An object of the invention is solved by a method according to claim 12.

It is a method for determining a concentration of a substance in a drop by means of a measuring device of the invention. The method comprises the following steps:
introducing the drop into the position determination space or creating the drop in the position determination space,
determining the position of the drop in relation to the beam path of the measuring device,
determining the extension of the drop,
determining the optical path length of the beam path in the drop,
measuring an absorption of an electromagnetic radiation, wherein electromagnetic radiation along a radiation path starting from the radiation source traverses the drop in the position determination space and arrives in the detector, wherein a radiation intensity of the radiation source is related to a radiation intensity in the detector, and
calculating the concentration as a function of the measured absorption and the determined optical path length in the drop.

There are two alternatives for the way in which the drop to be examined enters the position determination space. According to the first alternative, the drop is introduced into the position determination space from outside the position determination space, which can occur by free fall of the drop, for example. It is also possible to move a pipette tip with the drop hanging on it into the positioning space. According to the second alternative, the drop is generated in the position determination space, for example by dispensing from a pipette tip which is already in the position determination space before dispensing.

To determine the optical path length of the beam path, in the simplest case, if the beam path crosses a round drop at the point of its largest diameter, the determination of the drop diameter is sufficient. To determine the optical path length of the beam path in the drop, an optical beam path simulation can be used. The latter is useful if the optical path does not strike the drop surface perpendicularly and refraction effects must be considered. The refractive index of the drop at the wavelength of the electromagnetic radiation is considered. For a water drop, the refractive index n for visible light is approximately n=1.33 for a wavelength of 600 nm. The refractive index of water is smaller in the near infrared range than for visible light and increases in the near ultraviolet range, up to approx. n=1.5 for a wavelength of 200 nm. The simulation can be performed for a bundle of rays to consider the effect of the geometrical situation on the radiation intensity arriving at the detector.

The relationship between a concentration of an absorbent material can be determined using the Lambert-Beer law.

According to the Lambert-Beer law, the following relationship applies $$D=\log_{10}(I_0/I)=\varepsilon CL$$

wherein D is the absorbance, $I_0$ is the intensity of the incident radiation (at wavelength l), I is the intensity of the radiation after passing through the absorbing material (at wavelength $\lambda$), C is the concentration of the absorbing material, L is the length of the optical path in the absorbing material and $\varepsilon=\varepsilon(\lambda)$ is the (wavelength-specific) absorption coefficient.

Variants of the method result from the features of the dependent claims 13 and 14.

In one variant of the method, a first extension of the drop is determined before the step of measuring and a second extension of the drop is determined after the step of measuring. A mean value of the first and second extension of the drop is used to determine the concentration of the substance.

This variant of the method is particularly suitable for use with drops with small volumes, where the surface to volume ratio is so large that a noticeable portion of the drop evaporates over the course of a measuring process. By averaging, the effective extension of the drop during the measuring step can be measured more accurately without the risk of disturbing the measurement by determining the extension of the drop. In particular, the measurement can be carried out without having to switch on the illumination light for a recording with the camera.

A variant of the method is a method for determining a concentration of nucleic acids such as RNA (ribonucleic acid) or DNA (deoxyribonucleic acid), proteins or other biological or organic substances, wherein the electromagnetic radiation has a wavelength that is characteristic of the substance and optimal for determining the concentration. For example, the wavelength with the highest absorption of the substance is selected, or in the case of fluorescence measurement, the most fluorescent wavelength is selected. In general, by adjusting the wavelength, the measuring method can be adapted to the substance whose concentration is to be determined.

This method can be carried out in particular by using a pipetting robot according to the invention.

A first application example of the method according to the invention, in which a pipetting robot is used with the measuring device, is the quantification of an amount of RNA or DNA contained in a single drop. For this purpose, the absorbance of electromagnetic radiation passing through the drop is measured at different wavelengths characteristic of RNA/DNA. For example, an absorption spectrum is recorded over the wavelength range from 230 nm to 1000 nm. One possibility to determine the RNA/DNA concentration is to evaluate the absorbance at 260 nm, optionally considering the turbidity of the sample by measuring the absorbance at a wavelength of 320 nm. Absorption at longer wavelengths, e.g. at 320 nm, is mainly caused by larger particles that scatter light in the visible spectrum, which in this context is considered an impurity. In addition, the ratio of the absorption measurements at the wavelengths 260 nm and 280 nm, for example, can be used to determine a measure of the purity of a DNA sample or RNA sample with respect to contamination with, for example, proteins that typically absorb light at 280 nm. The determination of the ratio of the absorption values at 260 nm and 230 nm, for example, in turn provides information on possible contamination with phenolate, thiocyanate and other organic compounds.

A second application example of the method according to the invention, in which a pipetting robot is used with the measuring device, is the quantification of an amount of protein contained in a single drop. For this purpose, the absorbance of electromagnetic radiation passing through the drop is measured at 280 nm. The absorbance at 280 nm of the protein solution is due to the aromatic amino acids tryptophan and tyrosine as well as cysteine and disulfide-bridged cysteine residues. The protein concentration is calculated either from literature values or by comparison with a calibration curve.

In these examples the drop hangs on a pipette tip during the measurement. With the aid of the device according to the invention, which is part of the measuring device,
  a) the size of the drop is determined exactly so that the optical path length extending in the drop can be determined accurately, and
  b) the position of the pipette tip is aligned so that the radiation path used for the absorption measurement hits the hanging drop at the point of its greatest horizontal extension and in the middle.

With these measures, measurements with high accuracy and reproducibility are achieved. The inventors have recognized that without these measures, which are only made possible with the measuring device according to the invention, the radiation used for the absorption measurement is refracted by the curvature of a non-centrally positioned drop in directions that are difficult to control. Furthermore, the optical path length in such a case does not correspond to the drop diameter. Both effects lead to an inexact measurement.

With the method according to the invention, for example, a concentration of DNA in a drop with a lower detection limit of 2 ng/µl can be determined.

This method allows a fast and accurate measurement of substance concentration in a liquid drop without losing liquid during the measurement. This method can be used, for example, as a preparation step for further measurements, where any loss of sample liquid should be avoided.

Even further, the invention relates to a method according to claim 15.

This further method according to the invention is a method for holding a drop in the position determination space of a pipetting robot according to the invention. The method comprises the repeated application of the following steps:
  determining an actual position of a drop formed at the opening of a pipette tip of the pipetting robot in the position determination space on the basis of at least one image taken with the camera,
  determining a deviation of the determined actual position from a predetermined target position, and
  moving the pipette tip in a direction which brings the actual position closer to the target position.

Even further, the invention relates to a method for regulating a drop size of a drop in the position determination space of a pipetting robot according to the invention, wherein the method comprises the repeated application of the following steps:

determining an actual drop size of a drop formed at the opening of a pipette tip of the pipetting robot in the position determination space on the basis of at least one image recorded by the camera, determining a deviation of the determined actual drop size from a predetermined target drop size, and aspirating liquid into the pipette tip or ejecting liquid from the pipette tip, wherein aspiration is selected when the actual drop size is larger than the target drop size and ejection is selected when the actual drop size is smaller than the target drop size.

This method enables the regulation of the drop diameter by determining the drop diameter from the acquired images and by controlling a pressure changing device of the pipetting robot, e.g. a pump, in such a way that aspiration is performed when the drop diameter is too large and dispensing when it is too small. In one variant of this method, the method can also be combined with the aforementioned method to hold the drop at an actual position.

A regulation of the drop size can be carried out as follows, for example. The drop diameter is selected as the drop size to be regulated. A circle is fitted to a shadow image taken with the camera from two directions and its diameter is determined. The average of the two diameters determined by fit is used as the actual diameter. For example, the actual diameter is adjusted to a target diameter of 1.5-1.6 mm. For example, a slightly larger drop is created by the pipettor at the beginning and then some liquid is reabsorbed as required. For example, the regulation of the drop size is carried out after positioning. For example, after positioning a series of a few images is taken with an exposure time of 2 ms. Additionally, the drop size can be determined before and after the measurement, i.e. an absorption or fluorescence measurement, and the results can be compared to check the plausibility of an undisturbed process. In this way, it is possible to prevent, for example, the use of measurement results from measurements in which a drop has meanwhile undergone a strong deformation or the drop has even fallen off the pipette tip.

The inventors have recognized that drops can generally be produced in a stable manner in the range of diameters between approx. 1.3-2.0 mm. The above-mentioned range of the nominal diameter of 1.5-1.6 mm was found to be an optimal compromise between a large diameter, which is favorable for the measuring accuracy, and a small diameter, which reduces the risk of the drop falling off. For lower concentrations to be detected, slightly larger drops would be preferable. From 2.3 mm diameter on, the drops increasingly break off.

The beam diameter of the irradiated electromagnetic radiation can be 0.2 mm, for example. In combination with a drop diameter close to 1.6 mm, the beam diameter is approximately one order of magnitude smaller than the drop diameter. In this case, the effective optical path length can be approximated sufficiently accurately by the drop diameter, which is determined as the actual drop diameter as described above.

For example, the time scale of the control loop can be adapted to an image acquisition rate of 50 images per second.

Exemplary embodiments of the present invention are explained in more detail below using figures, wherein:

FIGS. 3b and 3c show schematic, perspective views of the geometric position of selected elements from FIG. 3a;

Figure 1:
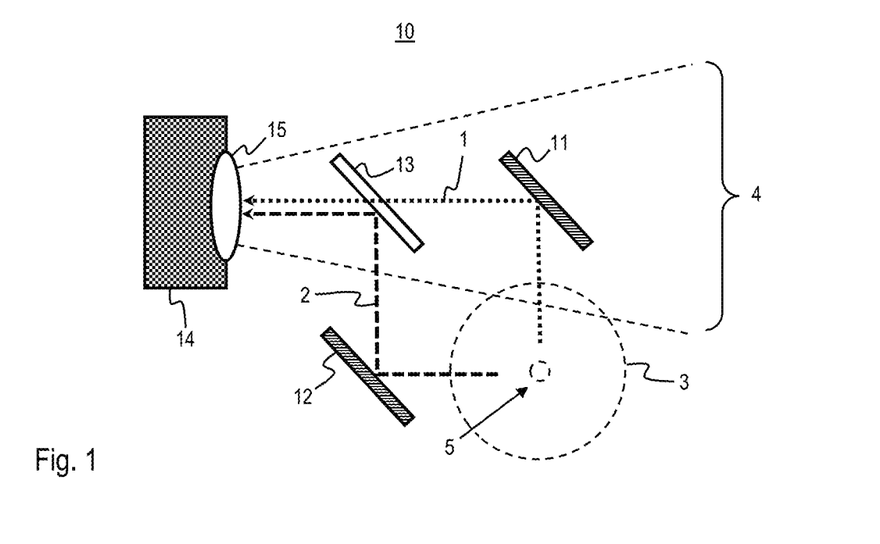
FIG. 1 shows a schematic cross-section of the device according to the invention.

FIG. 1 shows a schematic cross-section of the device 10 according to the invention. A dashed circle shows the position of the position determination space 3. Within the position determination space, a smaller dashed circle shows the possible position of a drop 5, the position and/or extension of which can be determined with the aid of the device 10. The device comprises a camera 14 with an objective 15 and a beam splitter 13 in the recording area 4 of the camera. The recording area 4 of the camera in front of the objective is schematically marked by dashed lines. It corresponds to the area from which incident light can reach an image sensor of the camera via the objective. Light from the position determination space 3 can reach the objective 15 along a first light path 1, which is drawn as a dotted line with an arrow. The light is reflected at a first reflector element 11 and radiated through the beam splitter 13. Light from the position determination space 3 can also enter the objective along a second light path 2, which is drawn as a dotted line with an arrow. In this case, the light is reflected at a second reflector element 12 and is also reflected at the beam splitter 13.

Figure 2:
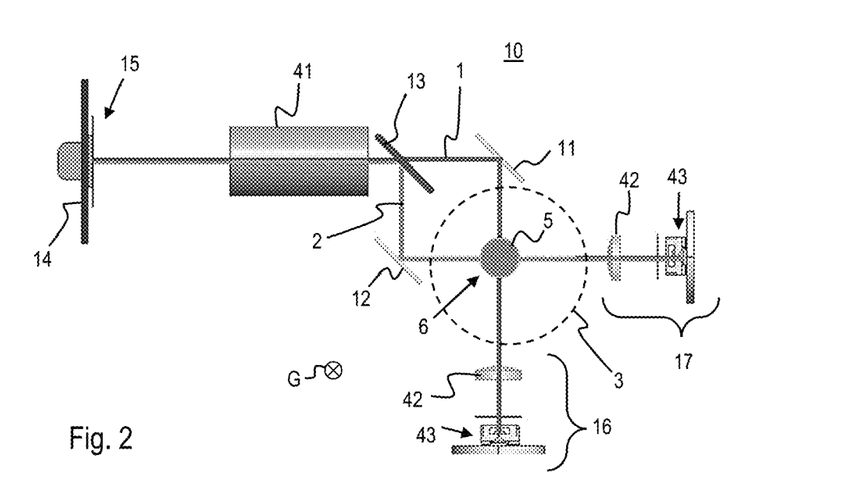
FIG. 2 shows a schematic cross-section through an embodiment of the device.

FIG. 2 shows a schematic cross-section of an embodiment of device 10. In the embodiment shown here, the first light path 1 and the second light path 2 intersect in the position determination space at a right angle. In the illustration shown, there is a drop 5, which is arranged straight at the intersection point 6 of the intersecting light paths. The intersection point 6 is located in the position determination space 3, whose position is indicated by a dashed line. The first reflector element 11 and the second reflector element 12 are arranged in the illustrated embodiment parallel to a reflecting surface of the beam splitter 13. The reflector elements 11 and 12 are further arranged symmetrically to the reflecting surface of the beam splitter 13. This results in a first path length of the first light path 1 from the intersection point 6 to the beam splitter 13 and a second path length of the second light path 2 from the intersection point 6 to the beam splitter, wherein the first and second path lengths are equally large. The embodiment shown here additionally comprises a first lighting element 16 and a second lighting element 17. Both lighting elements comprise a light emitting diode (LED) 43 and a lens 42 in the embodiment shown here. Light rays along the first light path 1 and along the second light path 2 are drawn here starting from the light emitting diode to the camera. One lighting element and one reflector element each are located on opposite sides of the position determination space. The drop is illuminated by the first lighting element 16 parallel to the first light path 1 and by the second lighting element parallel to the second light path 2. The parallelism of illumination direction and light path is determined by the direction of the section of the respective light path before the first or second reflector element. From the camera's point of view, drop 5 is illuminated from behind along both light paths and is displayed in a kind of shadow image. Alternatively to the lighting situation shown here, only one of the lighting elements can be switched on in a time-staggered manner, so that the position determination space and a drop disposed therein is illuminated by only one lighting element each. The lighting elements shown here are essentially identical in construction. A possible variant of the embodiment could include light emitting diodes of different colors.

The cross in the circle indicates the direction G of gravity, which in the situation shown is perpendicular to the image plane of the figure. Thus, the position determination space and also its imaginary continuation in direction G of gravity is free of elements of the device. A drop falling down from the position determination space in the direction of gravity will therefore not hit any of the elements of beam splitter 13, first reflector element 11, second reflector element 12 or camera 14.

A relay optic 41 is located between the beam splitter 13 and the camera 14. The camera may have a CMOS image sensor, for example.

The shown arrangement can be constructed in a very compact manner. For example, the distance from intersection point 6 to the first or second reflector element can be approx. 25 mm and the distance from intersection point 6 to one of the LEDs can be less than 30 mm.

With these dimensions and a camera with a pixel size of 10 micrometers, for example, an imaging system can be realized that achieves an optical resolution of approximately 6 micrometers per pixel, i.e. a displacement of a real object in the position determination space by 6 micrometers results in a displacement of the image by one pixel. In this case, the optical system leads to a reduction by a factor of about 1.7.

The optical layout of the embodiment shown is designed in such a way that with only two LEDs for illumination, two lenses, two mirrors, a beam splitter and a camera, a device is obtained which is suitable for determining a position and an extension of a drop, for example in the measuring chamber of a spectrometer. The LEDs are used to illuminate the drop from two directions, for example a horizontal x-direction and a perpendicular, also horizontal y-direction. In this case, the camera can take images of the drop from two different directions, but from the same distance, wherein images of the drop can be produced in an x-z plane and in a y-z plane. The z-direction in this example is the vertical direction, this means that the three-dimensional position information of the drop can be obtained with a device without moving parts. For example, two separate images can be obtained by sequentially illuminating the drop in the position determination space with only one of the two LEDs at a time. Based on such a pair of images, the size of the drop as well as the position of the drop can be regulated in three dimensions by a control loop, which for example includes the control of a pipetting robot.

In this context, it is possible to deviate temporarily from the usual software architecture of a control software, which provides that the control software controls the individual modules or devices (i.e. linear axes, pump, incubators, shakers, extraction modules, etc.) according to a predefined flow chart, in that in this case the measuring device determines how the pipette of the pipetting robot has to move based on the position data determined by the device according to the invention.

Figure 3A:
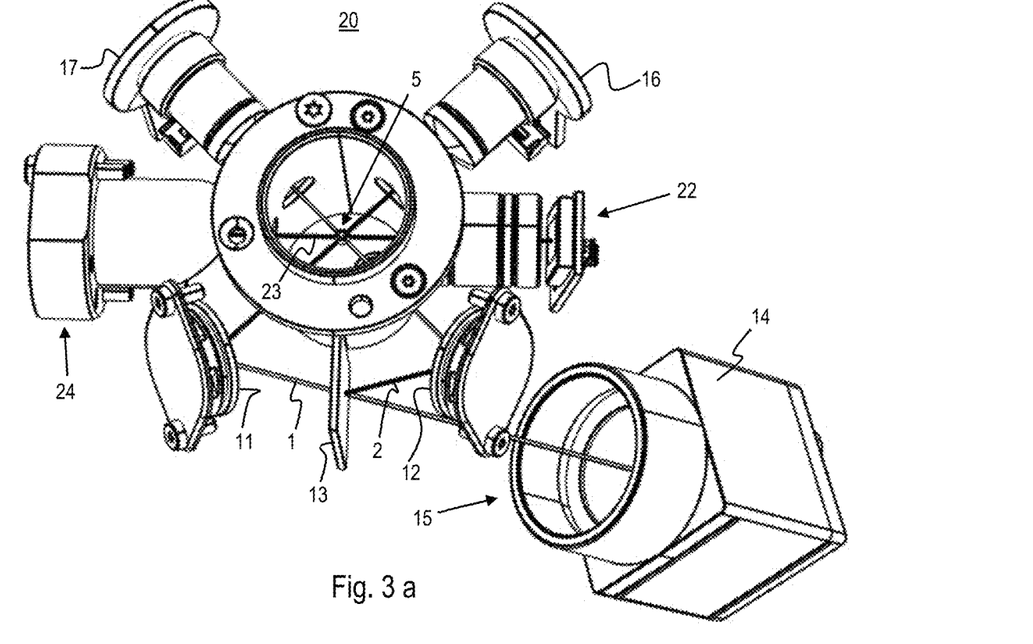
FIG. 3a shows a perspective view of an embodiment of the measuring device

FIG. 3a shows a perspective view of an embodiment of the measuring device 20. A drop 5 is located in the center of a position determination chamber, which is provided by a cylindrical wall with through-holes for light paths 1 and 2 or a beam path 23. In this position, the drop can, for example, hang on a pipette tip not shown. The measuring device includes a device according to the invention as described above. The device comprises a first reflector element 11, a second reflector element 12, a beam splitter 13 and a camera 14 with C-mount 44 for attaching an objective. In the manner described above, a first light path 1 and a second light path 2 lead in two different ways from the position determination space into the objective of the camera, which is not shown here for reasons of clarity, but whose position is determined by the position of the C-mount 44, which defines the position of the camera near end of the objective. In the embodiment shown, the device further comprises a first lighting element 16 and a second lighting element 17. Light from the first lighting element 16 can be irradiated into the area of drop 5 through the through-hole visible in the upper right corner of the cylindrical wall. From there, the light continues to follow the first light path 1 through an invisible through-hole via the first reflector element 11, through the beam splitter 13 into the objective. Light from the second lighting element 17 can be irradiated into the area of the drop 5 through the visible through-hole in the upper left corner of the cylindrical wall. From there, the light continues to follow the second light path 2 through an invisible through-hole via reflection at the second reflector element 12 and via reflection at the beam splitter 13 into the objective of the camera. The first and second light paths coincide in the shown arrangement in the area between beam splitter 13 and C-mount 44. The measuring device 20 further comprises a radiation source (not shown) for electromagnetic radiation and a detector 22 for the electromagnetic radiation. The radiation source can be a flash lamp, for example. A radiation path 23 leads from the radiation source via a monochromator and is deflected and focused via the ellipsoid mirror 24. The radiation path passes through a through-hole in the cylindrical wall, through drop 5 and through another, invisible, through-hole to detector 22, where a radiation intensity of the electromagnetic radiation can be measured. The first and second light paths 1, 2 and the radiation path 23 define a common first plane in the area of the drop and intersect at a common point of intersection. The two light paths intersect each other at an angle of about 90° and intersect the radiation path 23 at an angle of about 45°. Due to the tilted arrangement of the first and second reflector elements 11, 12, the first and second light paths leave this plane after reflection at the respective reflector element.

The lighting elements 16, 17, for example, each comprise a light emitting diode and a lens arranged in a housing in front of the light emitting diode. The reflector elements 11, 12, for example, are designed as planar mirrors. Regarding the reflecting side, arranged behind the reflector elements 11, 12, a suspension for precise alignment of the mirrors can be seen.

Figures 3B, 3C:
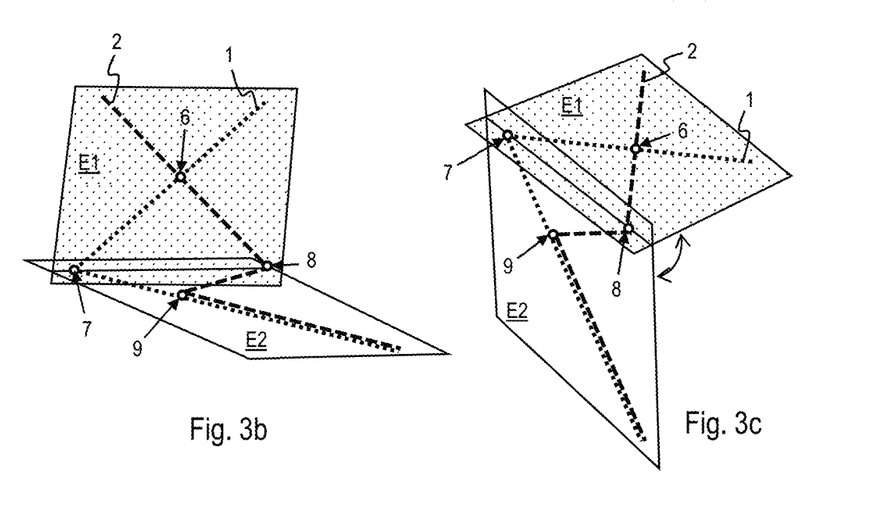

FIG. 3b shows, in a reduced manner but in comparison to FIG. 3.a) in unchanged orientation, the first light path 1 and the second light path 2. The first plane E1 is defined by the first light path 1 and the second light path 2 in the area between the intersection point 6 of the light paths, the point 7 on the first reflector element where the first light path is deflected, and point 8 on the second reflector element where the second light path is deflected. The first plane is shown as dotted. The first light path 1 is shown as a dotted line, the second light path 2 as a dashed line. From points 7 and 8, the light paths extend in a second plane E2, which is inclined with respect to plane E1. The point 9 on the beam splitter 13 lies in the plane E2. From this point, the two light paths 1, 2 coincide.

FIG. 3*c* shows the same as FIG. 3*b* but from a slightly different angle. In addition, the angle α at which the first plane E1 and the second plane E2 intersect is shown. The angle α can be about 90°, for example. In one embodiment, the plane E1 can be a horizontal plane, which is perpendicular to the direction G of gravity. In this case, the light paths lead down into the objective of the camera, which is arranged below the plane E1 to save space.

In this arrangement the camera is also outside of a possible falling direction of the drop.

The compact design, which is implemented in the embodiment of the device as shown in FIGS. 3*a* (as part of the measuring device), 3*b* and 3*c*, allows the camera to be placed underneath a work surface that is parallel to the plane E1. The reflector elements are tilted in relation to the plane E1, i.e. also in relation to the working surface. The reflector elements are also tilted with respect to a plane defined by the beam splitter. The plane defined by the beam splitter forms in this case also a symmetry plane of the two reflector elements.

Figure 4:
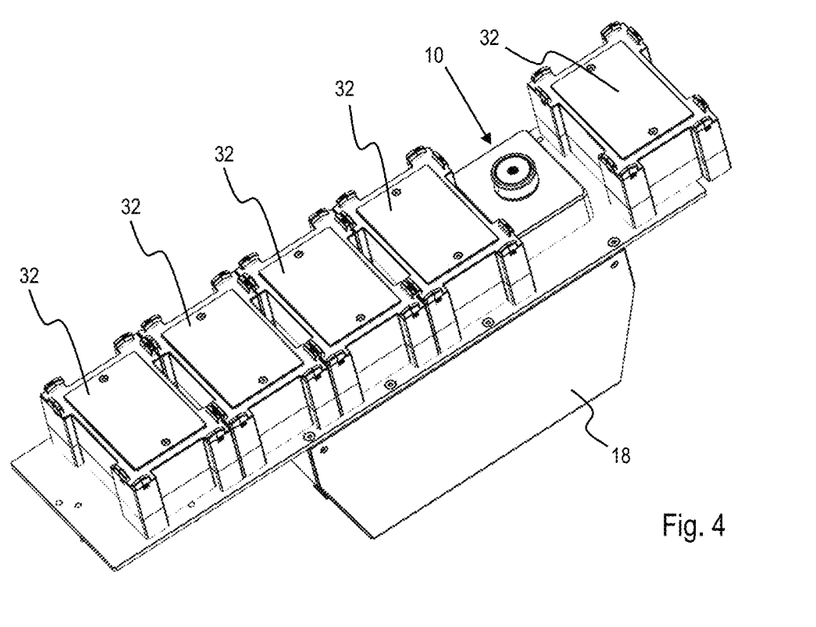
FIG. 4 shows an arrangement of an embodiment of the device in connection with a part of a pipetting robot.

FIG. 4 shows an exemplary arrangement of an embodiment of the device, as it can be arranged as part of a pipetting robot. Only one storage area for microplates and some holders 32 for standard microplates are shown. The device 10 has a round access opening, open at the top, for inserting a pipette tip into the position determination space of the device, which is located inside the cuboid housing. A further housing 18 is located below the microplate storage area and contains the camera of the device, which is not visible in this view. The housing 18 can contain further components, for example a monochromator of a spectrometer. In this embodiment, the geometrical arrangement of the position determination space and the camera can be chosen as shown in FIG. 3*a*, for example. In this way a very space-saving arrangement is created, where the device has only the space requirement of a single holder for standard microplate.

With the compact design shown, the device according to the invention can be ideally integrated as a module into a platform for handling liquids, especially in a platform where the standing surface of a module is critical. The embodiment shown saves space on the work surface.

Figure 5:
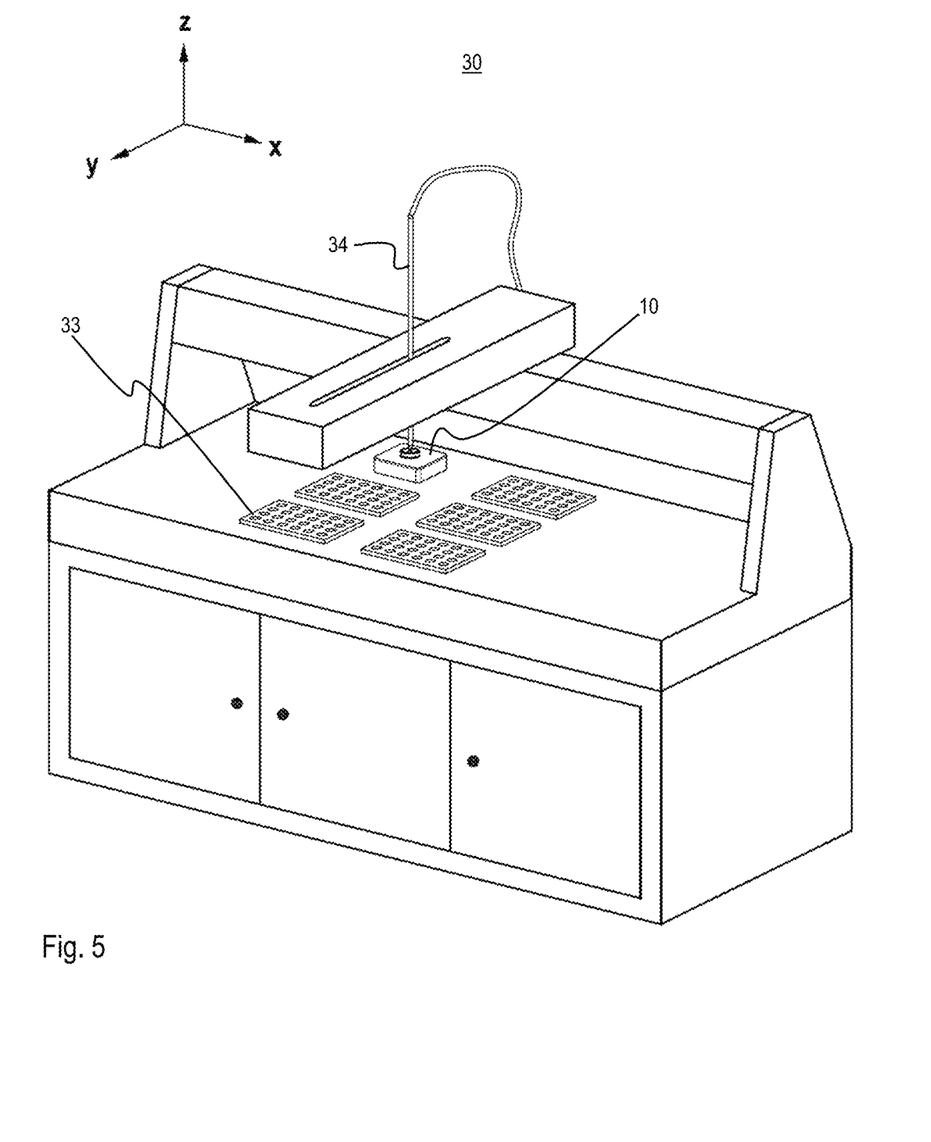
FIG. 5 shows a perspective view of a pipetting robot with a device according to the invention.

FIG. 5 shows a pipetting robot 30 with a device 10 according to the invention in the context of an exemplary application. The pipetting robot comprises controllable linear axes, which can move a pipette in the three directions of a Cartesian coordinate system represented by arrows in x-, y- and z-direction. A pipetting channel 34, at the lower end of which a pipette tip is located, is connected to a pump device by a flexible tube. The pipette tip is located directly above an opening of the device 10. By lowering the pipette tip in negative z-direction, the pipette tip can be retracted into the device. Microplates 33 are arranged on a work surface of the pipetting robot. The shown microplates have 4×6 wells, but also microplates with 8×12 wells or other common microplates could be used. The space requirement of the device 10 on the working surface in relation to the microplates is shown realistically. It shows the compact design that is possible with the device according to the invention.

Figure 6:
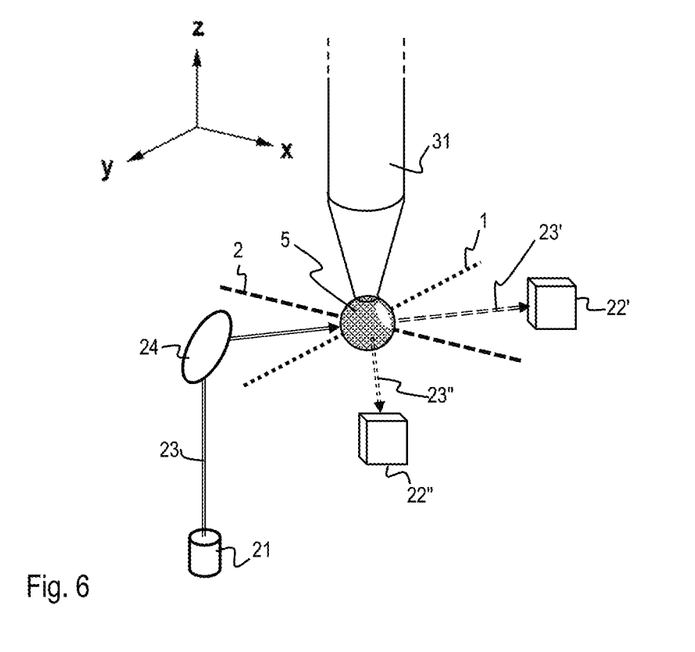
FIG. 6 shows a schematic, perspective view of the situation in the position determination space for an embodiment of the measuring device or an embodiment of the pipetting robot.

FIG. 6 shows schematically the arrangement of elements of an embodiment of the measuring device or the pipetting robot in connection with the position determination space of the device during a measuring process on a drop 5. The drop 5 hangs on a pipette tip 31, which is movable in x-, y- and z-direction of the illustrated Cartesian coordinate system by linear axes of a pipetting robot. A section each of the first light path 1 and the second light path 2 are drawn as dotted and dashed lines, respectively, so that the orientation of the other elements relative to the light paths of the device can be seen. A radiation path 23 of electromagnetic radiation emanates from the radiation source 21 and is deflected in the direction of the drop by a mirror 24, which can be an ellipsoid mirror, for example. A detector for measuring the intensity of the electromagnetic radiation is arranged in a straight line behind the drop. At this point the intensity reduced by absorption in the drop can be measured. Vertical to this beam direction is another detector 22'. At this point the intensity of electromagnetic radiation generated by fluorescence in the drop can be measured. Long dashed and short dashed are the sections 23', 23" of the radiation path between the drop and the detector for the absorption measurement and for the fluorescence measurement. In the embodiment shown here, the radiation source 21 can both provide the irradiated intensity for the absorption measurement and excite a fluorescence. In the embodiment shown here, the first light path 1, the second light path 2, the section of radiation path 23' leading to detector 22' for absorption and the section of radiation path 23" leading to detector 22" for fluorescence are all in a common plane.

It is also possible to measure fluorescence at another z-position alternatively or additionally. Thus, the following procedure is also conceivable within the scope of the invention: Determination of the drop position in x and y by means of the device for position determination and subsequent traversing of a predefined distance in z-direction. This means that the plane of the measurement does not necessarily have to correspond to the plane of the position determination.

LIST OF REFERENCE NUMERALS

1 First light path
2 Second light path
3 Position determination space
4 Recording area of the camera
5 Drop
6 Intersection point
7 Point on first reflector element
8 Point on second reflector element
9 Point on beam splitter
10 Device
11 First reflector element
12 Second reflector element
13 Beam splitter
14 Camera
15 Objective
16 First lighting element
17 Second lighting element
18 Housing (contains camera)
20 Measuring device
21 Radiation source
22, 22', 22" Detector
23 Radiation path
23', 23" Sections of the radiation path in front of the detector
24 Ellipsoid mirror
30 Pipetting robot
31 Pipette tip
32 Holder for standard microplates
33 Microplate
34 Pipetting channel 41 Relay optic
42 Lens
43 LED
44 C-mount of the camera
D Diameter of the drop
E1 First plane
E2 Second plane
α Angle between first and second plane
G Direction of gravity

The invention claimed is:

1. Device (10) for determining a position and/or an extension of a drop (5) in a position determination space (3), wherein the device comprises a camera (14) having an objective (15), a beam splitter (13) in a recording area (4) of the camera, a first reflector element (11), a second reflector element (12), a first lighting element (16) providing light along a first light path, and a second lighting element (17) providing light along a second light path,
    wherein the recording area (4) of the camera comprises a spatial area in front of the objective that can be imaged onto an image sensor of the camera,
    wherein the beam splitter (13), the first reflector element (11), and the second reflector element (12) are positioned so that light coming from the position determination space (3) enters the objective of the camera both along the first light path (1) and along the second light path (2),
    wherein the second reflector element (12) is positioned with respect to the beam splitter (13) so that light along the second light path (2) is reflected at the second reflector element (12) in a direction of the beam splitter (13) and is reflected at the beam splitter towards the objective (15),
    wherein the first reflector element (11) is positioned with respect to the beam splitter (13) so that light along the first path (1) is reflected at the first reflector element (11) in the direction of the beam splitter (13) and is transmitted through the beam splitter (13) to the objective (15),
    wherein the first lighting element (16) and the second lighting element (17) are positioned so that the first light path (1) and the second light path (2) intersect at an intersection point (6) in the position determination space (3),
    wherein sections of the first light path (1) and second light path (2) between the intersection point (6) in the position determination space and the first reflector element (11) and the second reflector element (12) define a first plane (E1),
    wherein sections of the first light path (1) and the second light path (2) between the beam splitter and the first reflector element (11) and the second reflector element (12) define a second plane (E2), and
    wherein the first reflector element (11) and the second reflector element (12) are positioned so that the second plane is arranged in a tilted manner relative to the first plane.

2. Device (10) according to claim 1, wherein the first and the second light path intersect at right angles.

3. Device (10) according to claim 2, wherein the first reflector element (11), the second reflector element (12), the first lighting element (16) and the second lighting element (17) are positioned so that a first path length of the first light path (1) from the intersection point (6) in the position determination space to the beam splitter (13) is equal to a second path length of the second light path (2) from the intersection point (6) in the position determination space to the beam splitter (13).

4. Device (10) according to claim 1 wherein the first lighting element (16) and the first reflector element (11) are arranged on mutually opposite sides of the position determination space (3), wherein the second lighting element (17) and the second reflector element (12) are arranged on mutually opposite sides of the position determination space, wherein the first lighting element illuminates a drop (5) in the position determination space parallel to a direction of the first light path (1) in front of the first reflector element (11), and wherein the second lighting element illuminates a drop in the position determination space parallel to a direction of the second light path (2) in front of the second reflector element (12).

5. Device (10) according to claim 4, wherein the first lighting element and the second lighting element are substantially identically constructed, wherein the first and the second lighting element are adapted to, in a temporal aspect, alternately not illuminate the position determination space (3) at all or to illuminate the position determination space (3) individually.

6. Device (10) according to claim 1, wherein the beam splitter (13), the first reflector element (11), the second reflector element (12) and the camera (14) are located outside an area comprising the position determination space and its imaginary continuation in the direction (G) of gravity.

7. Measuring device (20) for measuring an absorption of an electromagnetic radiation in a drop (5) and/or for measuring a fluorescence excited by an electromagnetic radiation in a drop (5), wherein the measuring device comprises a device (10) according to claim 1, wherein the measuring device further comprises a radiation source (21) of electromagnetic radiation and a detector (22) for electromagnetic radiation and/or fluorescence, wherein the radiation source (21) is positioned such that electromagnetic radiation arrives at the detector along a radiation path (23) from the radiation source via a drop in the position determination space, and wherein the device determines a position of the drop in relation to the radiation path based on a radiation intensity and/or a fluorescence measured by the detector (22).

8. Measuring device (20) according to claim 7, wherein the first lighting element (16), the second lighting element (17), and the radiation source (21) are positioned so that the first light path (1), the second light path (2) and the radiation path (23) intersect in a common intersection point (6) in the position determination space (3).

9. Pipetting robot (30) having a device (10) according to claim 1, wherein the pipetting robot is configured:
    to move a pipette tip (31) into the position determination space (3) of the device,
    to form a drop (5) of a liquid outside an opening of the pipette tip, and
    to determine a position of the formed drop in the position determination space on the basis of at least one image recorded by the camera (14).

10. Pipetting robot (30) having a measuring device (20) according to claim 7 and having means for moving at least one pipette tip (31) in at least one direction of movement, wherein the pipetting is configured:
    to move the at least one pipette tip into the position determination space (3) of the device (10),
    to form a drop (5) of a liquid outside an opening of the pipette tip, to determine a position and/or an extension of the formed drop in the position determination space on the basis of at least one image taken with the camera (14), and to measure, by using the measuring device (20), an absorption of an electromagnetic radiation in the drop and/or to measure a fluorescence excited by an electromagnetic radiation in a drop.

11. Method for determining a concentration of a substance in a drop (5) by means of a measuring device (20) according to claim 7, comprising the steps of introducing the drop (5) into the position determination space (3) or creating the drop in the position determination space, determining the position of the drop in relation to the radiation path (23) of the measuring device, determining the extension of the drop, determining the optical path length of the radiation path in the drop, measuring an absorption of an electromagnetic radiation, wherein electromagnetic radiation along the radiation path starting from the radiation source (21) traverses the drop in the position determination space and arrives in the detector (22), wherein a radiation intensity of the radiation source is related to a radiation intensity in the detector, and calculating the concentration as a function of the measured absorption and the determined optical path length in the drop.

12. Method according to claim 11, wherein a first extension of the drop (5) is determined before the step of measuring, wherein a second extension of the drop is determined after the step of measuring, and wherein an average value of the first and second extension of the drop is used to determine the concentration of the substance.

13. Method according to claim 11, wherein the method is a method for determining a concentration of RNA, DNA or protein, wherein the electromagnetic radiation has a wavelength characteristic of RNA, DNA or proteins.

14. Method for holding a drop (5) in the position determination space (3) of a pipetting robot (30) according to claim 9, wherein the method comprises the repeated application of the following steps:

determining an actual position of a drop formed at the opening of a pipette tip (31) of the pipetting robot in the position determination space (3) on the basis of at least one image recorded by the camera (14), determining a deviation of the determined actual position from a predetermined target position, and moving the pipette tip in a direction which brings the actual position closer to the target position.

15. Method for regulating a drop size of a drop (5) in the position determination space (3) of a pipetting robot (30) according to claim 9, wherein the method comprises the repeated application of the following steps:

determining an actual drop size of a drop formed at the opening of a pipette tip (31) of the pipetting robot in the position determination space (3) on the basis of at least one image recorded with the camera (14), determining a deviation of the determined actual drop size from a predetermined target drop size, and aspirating liquid into the pipette tip or ejecting liquid from the pipette tip, wherein aspiration is selected when the actual drop size is larger than the target drop size and ejection is selected when the actual drop size is smaller than the target drop size.

* * * * *